Oct. 23, 1956 — E. E. SCHAEFER — 2,767,455
HOSE CLAMP
Filed Jan. 29, 1954 — 2 Sheets-Sheet 1
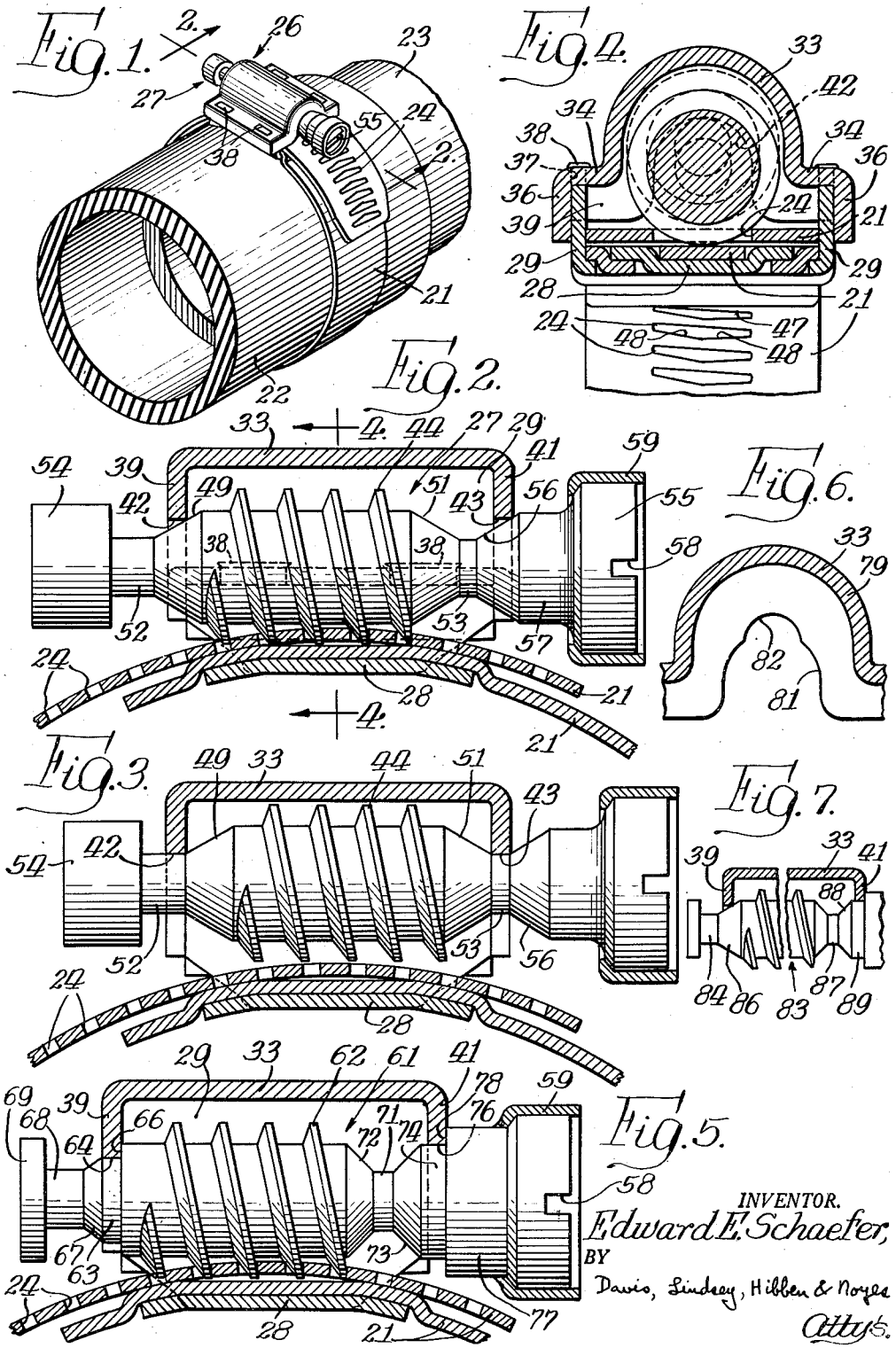
INVENTOR.
Edward E. Schaefer,
BY Davis, Lindsey, Hibben & Noyes
Attys.

Oct. 23, 1956 E. E. SCHAEFER 2,767,455
HOSE CLAMP
Filed Jan. 29, 1954 2 Sheets-Sheet 2
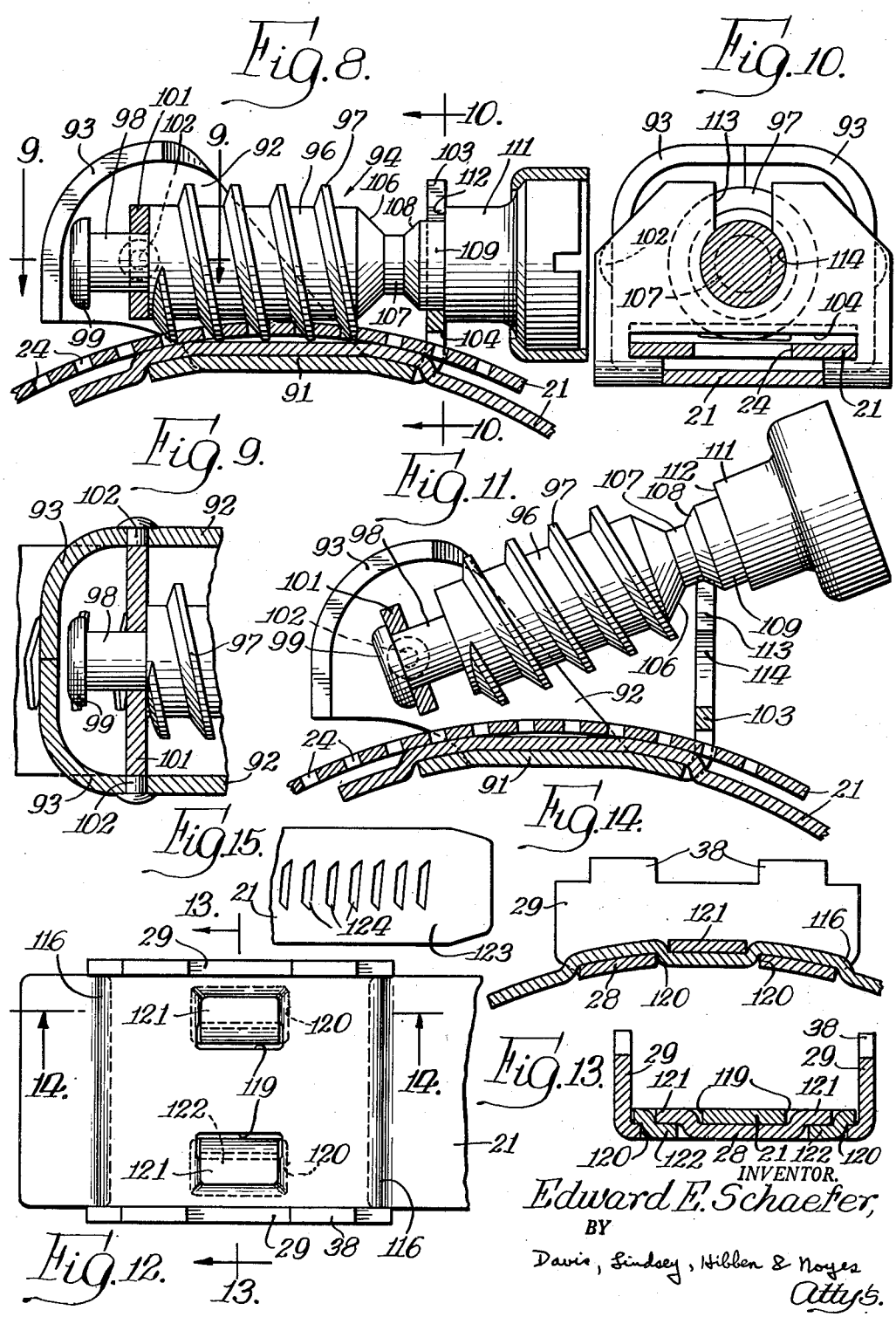

United States Patent Office 2,767,455
Patented Oct. 23, 1956

2,767,455

HOSE CLAMP

Edward E. Schaefer, River Forest, Ill., assignor to Oak Park Trust & Savings Bank, Oak Park, Ill., as trustee Application January 29, 1954, Serial No. 406,940

15 Claims. (Cl. 24—274)

This invention relates to improvements in hose clamps of the type used in connecting a hose to tubes or pipes such as in aircraft or the like.

Generally speaking, the hose clamps of the type to which my invention pertains include an elongated metal band adapted to encircle the hose and having a series of slots at one end and a screw housing rigidly fastened at the opposite end of the band. A tightening screw or worm is rotatably mounted in the housing, and the clamp is attached by extending the slotted end of the band through the housing so that the screw thread can engage the slotted areas of the band. As the screw is tightened, the free end of the band is drawn through the housing until the band is snugly clamped around the hose for sealing the same to a pipe or other fitting extending into the hose.

In hose clamps of the foregoing type it is very desirable that the clamp be capable of rapid attachment and detachment. However, in most of the clamps heretofore proposed the tightening or loosening process is relatively slow and tedious because the free end of the band can be drawn through or retracted from the housing only by rotation of the screw either by means of a screwdriver or an attached finger piece. At least one attempt has been made to overcome this operating disadvantage by swivelling one end of the tightening screw in the housing so that the screw can be pivoted into or out of engagement with the slotted end of the band, rotation of the screw being necessary only for final tightening or initial loosening of the clamp. Aside from increased cost of manufacture and complexity of construction, this device has not been satisfactory because of the danger of inadvertent release of the pivoted tightening screw. The addition of special locking devices results only in a further increase in the cost and complexity of the clamp.

Accordingly, a primary object of my invention is to provide a novel and improved tightening mechanism for a hose clamp of the character described.

A further object of the invention is to provide a novel hose clamp of the character described which is capable of rapid manipulation during tightening and loosening of the clamp.

Still another object of the invention is to provide a novel rapid-action hose clamp of the type described having a relatively simple and inexpensive construction.

An additional object of the invention is to provide an improved hose clamp of the type described characterized by a novel "floating" relation between the tightening screw and its housing.

Still another object of the invention is to provide a novel means of attaching the tightening mechanism to the clamping band in a hose clamp of the type described.

Other objects and advantages of the invention will be understood from the subsequent detailed description taken in conjunction with the accompanying drawings, wherein:

Fig. 1 is a perspective view showing one embodiment of the invention in position on a hose;

Fig. 2 is an enlarged longitudinal sectional view through the tightening mechanism of the clamp as taken along the line 2—2 of Fig. 2 and showing the mechanism in engaged relation;

Fig. 3 is a view similar to Fig. 2 but showing the tightening mechanism in disengaged position;

Fig. 4 is a transverse sectional view taken along the line 4—4 of Fig. 2;

Fig. 5 is a view similar to Fig. 2 but showing a modification of the invention;

Fig. 6 is a fragmentary transverse sectional view showing a modification of the housing of the tightening mechanism;

Fig. 7 is a fragmentary longitudinal sectional view showing still another modification of the tightening mechanism illustrated in Figs. 2 and 5;

Fig. 8 is a longitudinal sectional view showing a different embodiment of the invention;

Fig. 9 is a fragmentary longitudinal sectional view as taken along the line 9—9 of Fig. 8;

Fig. 10 is a transverse sectional view as taken along the line 10—10 of Fig. 8;

Fig. 11 is a view similar to Fig. 8 but showing the mechanism in disengaged relation;

Fig. 12 is a fragmentary plan view showing the details of the connection of the housing of the tightening mechanism to the band;

Fig. 13 is a transverse sectional view taken along the line 13—13 of Fig. 12;

Fig. 14 is a longitudinal sectional view as taken along the line 14—14 of Fig. 12; and Fig. 15 is a fragmentary plan view showing a modified form of one element of the invention.

Referring first to Figs. 1 to 4 of the drawing, one embodiment of the invention comprises an elongated flat band 21 which encircles a hose 22 for snugly clamping the latter to a tube or pipe 23 projecting into the hose. One end portion of the band 21 is provided with a series of longitudinally-spaced transversely-extending slots or apertures 24, and the opposite end of the band 21 has rigidly secured thereto a tightening mechanism indicated generally at 26. As will hereinafter appear, the tightening mechanism 26 includes an elongated rotatable screw or worm 27 having a spiral thread adapted to extend into and coact with the slots 24 for effecting tightening of the band. The slots 24 are disposed at a slight incline to accommodate the spiral thread.

The tightening mechanism 26 includes a housing or casing for the screw 27 and in this instance has a two-part construction. The base or saddle portion of the housing is a substantially U-shaped member having a base 28 underlying the band 21 and upstanding side walls 29. The saddle may be secured to the band 21 by spot welding, but preferably by a cooperating tang and recess arrangement hereinafter described in detail.

The upper portion of the screw housing comprises a cover having a longitudinally extending semi-cylindrical portion 33 with horizontally extending sides 34 and depending terminal flanges 36. The horizontal sides 34 have a plurality of openings 37 into which extend a plurality of prongs 38 projecting upwardly from the saddle side walls 29. The upper ends of the prongs 38 projecting through the openings 37 are peened or riveted over for securely and rigidly connecting the cover portion and the saddle portion of the housing.

The upper portion or cover of the screw housing also has a pair of end walls 39 and 41 which are spaced slightly from the portion of the band 21 overlying the saddle base 28 so as to accommodate the slotted end portion of the band 21 which extends through the housing in overlapping relation. These end walls 39 and 41 are formed with U-shaped slots 42 and 43, respectively, the slot 43 being somewhat wider in this instance than the slot 42.

The elongated tightening screw or worm 27 is rotatably disposed within the housing, as best seen in Figs. 2 and 3, and the central body portion of the screw has a continuous spiral thread 44 adapted to protrude into the slots 24 of the band 21. From Fig. 2 it will be apparent that the working or back faces of the screw thread 44 are flat so as to provide effective surface engagement with the edges of the slots 24. To this end, the corresponding side wall of each slot 24 is straight, as at 47 (Fig. 4). The opposite or front faces of the screw thread 44 are inclined as shown and also have a convex curvature in a plane tangent to the body of the screw. The corresponding edges of the slots 24 have a pair of angularly extending walls 48 so that the slots 24 have a substantially triangular shape. During tightening of the screw 27, the flat working faces of the screw thread 44 engage the straight slot edges 47 for projecting the slotted end portion of the band 21 and holding the same in tightened relation. However, during reverse rotation of the screw 27 for loosening the clamp and also during initial manual insertion of the slotted end of the band into the housing, the curved and inclined face of the screw thread 44 engages the angular slot edges 48 at substantially only two spaced points, as will readily be understood. Thus, during initial manipulation of the clamp to install the same and also during loosening of the tightened clamp there is a minimum extent of surface contact between the screw thread 44 and the slot edges 48 so as to facilitate rapid action of the clamp.

Referring now to Figs. 2 and 3, the primary novel feature of the invention will be described. The central body portion of the screw 27 carrying the spiral thread 44 is tapered downwardly at 49 and 51 to provide reduced portions 52 and 53, respectively. An enlargement or finger piece 54 is provided at one end of the screw adjacent the reduced portion 52 and disposed outside of the screw housing in order to prevent the end of the screw from passing axially to the right through the slot 42. At its opposite end, the screw is again tapered outwardly, as at 56, from the reduced portion 53 to an enlarged portion 57 having a head 55 with a slot or kerf 58 for receiving a screwdriver and a guide sleeve 59 for facilitating operating engagement of the screwdriver with the screw head. The enlarged head 55 prevents axial passage of the screw to the left through the slot 43.

As seen in Fig. 2, when the screw 27 is in tightened engagement with the slots 24, the screw is urged axially to the left so that the tapered portions 49 and 56 seat against the edges of the slots 42 and 43, respectively, in journaled relation therewith. It will be understood that as the screw 27 is tightened by rotation thereof in a clockwise direction, the camming action of the tapered screw portions 49 and 56 engaging the edges of the slots 42 and 43 will cause the screw 27 to be urged bodily downwardly against the band as it also moves axially or longitudinally to the left within the screw housing. Thus, tightening of the screw 27 not only increases the clamping action of the band 21 but also causes the screw thread 44 to be engaged even more securely within the slots 24 thereby providing added insurance against inadvertent disengagement of the device.

When it is desired to loosen or release the clamp, the screw 27 is rotated for a few turns in a counterclockwise direction by means of a screwdriver in order to relieve the fully tightened or locked engagement of the screw. Thereafter, the screw 27 can be grasped at its opposite ends by the head portion 55 and the finger piece 54 and shifted axially or longitudinally to the right relative to its housing whereby to bring the reduced screw portions 52 and 53 into the slots 42 and 43. Thereafter, the screw can be lifted radially outwardly within its housing, as shown in Fig. 3, so that the screw thread 44 is completely disengaged from the slotted portion of the band 21. When the screw is thus disengaged and is loose within its housing, the enlarged end portions 54 and 55 prevent the screw from slipping out of the housing, particularly when the clamp is detached. It will be apparent that the provision of the reduced screw portions 52 and 53 and the housing slots 42 and 43 in conjunction with the axial movability of the screw 27 relative to its housing are responsible for this disengaging effect. Once the screw thread 44 is disengaged from the slots 24 the released end portion of the band can be quickly withdrawn from the screw housing to permit complete loosening or removal of the clamp from the hose. Thus, it will be seen that the foregoing structure is quite different from the hose clamps of the type previously known wherein the screw thread was at all times engaged with the band slots and complete loosening of the clamp could be obtained only by rotary manipulation of the screw.

My invention also permits more rapid tightening or assembly of the clamp on a hose by reversing the foregoing mode of operation. In other words, the operator first holds the screw 27 in its Fig. 3 position and then inserts the loose slotted end of the band through the screw housing and projects the same as far as possible by manual pressure, it being understood that the screw thread is spaced from the band so as to permit this initial manipulation. Thereafter, the operator releases the screw 27 thereby allowing the screw thread 44 to drop into or seat in the slots 24. The tendency of the overlapping band to expand under the resilient pressure of the compressed hose will immediately cause the screw 27 to be shifted axially to the left so that the tapered screw portions 49 and 56 are brought into engagement with the edges of the housing slots 42 and 43. To secure the final degree of tightening of the clamp, it will usually only be necessary to apply a relatively few turns to the screw 27 by means of a screwdriver, and as the overlapping end of the band is drawn tightly around the hose, the screw 27 will also be shifted axially to the left and thereby urged downwardly into more secure engagement with the slotted band as the tapered portions 49 and 56 are cammed downwardly.

In Fig. 5 there is shown a modification of the screw or worm structure which affords the same axial floating action hereinbefore described for facilitating rapid tightening and release of the clamp. The portions of the structure which are the same as in Figs. 1 to 4 have been given the same reference numerals. In this case, the screw is designated generally at 61 and has a spiral thread 62 on its central body portion as before. The left-hand end of the screw has a reduced cylindrical portion 63 which, in engaged position of the screw as seen in Fig. 5, seats in journaled relation in a slot 64 provided in the end wall 39 of the screw housing. The reduction in diameter of the screw at the portion 63 affords a shoulder 66 which seats against the end wall 39 when the clamp is tightened. Beyond the reduced portion 63 the screw is tapered, as at 67, to a cylindrical portion 68 which is of still smaller diameter. An enlarged finger piece 69 is provided at the extreme end of the screw. At the opposite end of the body portion of the screw a reduced neck portion 71 is provided between oppositely tapered portions 72 and 73. Beyond the tapered portion 73, the screw is again enlarged to a cylindrical bearing portion 74 which is journaled in a slot 76 in the end wall 41 of the housing. The outer right-hand extremity of the screw has a further enlarged head portion 77 providing a shoulder 78 which seats against the end wall 41 of the housing when the clamp is tightened.

It will be evident that the principal difference of the Fig. 5 screw structure over the first described embodiment resides in the provision of the reduced cylindrical bearing portions 63 and 74. As a result, it will be seen that when the clamp is tightened the bearing portions 63 and 74 are journaled in the slotted portions 64 and 76, respectively, of the housing. With this arrangement there is a greater degree of bearing contact between the screw and the housing as contrasted with the Fig. 2 arrangement wherein the tapered portions 49 and 56 are in bearing engagement with only the corner edges of the slots 42 and 43. Consequently, for many uses the Fig. 5 modification will be found more effective because of its increased strength and structural stability. When the clamp is tightened the tension in the band 21 urges the screw 61 to the left as seen in Fig. 5 but the shoulders 66 and 78 afford accurate positioning of the screw within the housing and retention thereof against further axial movement.

It will be understood that the clamp is released in the same general manner hereinbefore described by first effecting preliminary loosening of the screw 61 with a screwdriver and thereafter manually shifting the screw axially to the right so as to bring the reduced screw portions 68 and 71 into register with the housing slots 64 and 76, respectively. With the radial clearance thus provided, the screw can then move outwardly in its housing so that the spiral thread 62 is disengaged from the slotted portion of the band to permit removal of the clamp. To attach the clamp, the screw 61 is first manipulated manually to effect preliminary engagement of the screw thread 62 in the band slots in the manner previously described and whereby the tapered screw portions 67 and 73 are brought into engagement with the right hand corner edges of the slots 64 and 76 in much the same manner as shown in Fig. 2. As the screw is thereafter tightened with a screwdriver to its final degree of tightness, the screw is cammed downwardly in the housing as the tapered portions 67 and 73 ride along the corner edges of the slots 64 and 76, and finally the screw reaches its Fig. 5 position wherein the cylindrical bearing portions 63 and 74 are disposed in the slots 64 and 76 and the shoulders 66 and 78 engage the end walls of the housing. During that portion of the tightening operation when the tapered surfaces 67 and 73 are in engagement with the corner edges of the slots 64 and 76 it will be understood that increased tightening of the screw forces the screw thread 62 downwardly into more secure engagement within the band slots 24. However, once the screw has advanced to its Fig. 5 position, it will be seen that further tightening of the screw merely increases the circumferential clamping action of the band 21 without any further urging of the screw and its thread 62 downwardly into the slots of the band.

In Fig. 6 I show a modification of the screw housing structure which may be desirable in certain instances in order to provide an increased degree of clearance during disengagement of the screw from the band slots. For this purpose, the end walls of the screw housing, one of which is indicated at 79, each have a slot 81 with an upper extension 82 of reduced width. With a housing of this type, the tapered screw portions 49 and 56 as shown in Fig. 2 will coact with the edge of the enlarged slot portion 81 of the housing when the clamp is tightened. However, when the clamp is in loosened condition and the screw is shifted axially to register the reduced portions 52 and 53 with the end slots in the housing, it will be seen that the reduced screw portions can be moved upwardly into the slot extensions 82 whereby to provide a greater degree of disengaging clearance between the screw thread and the band slots than would otherwise be the case with the continuous U-shaped slots 43 and 42. With the Fig. 5 screw modification, the tapered screw portions 67 and 73 and also the cylindrical bearing portions 63 and 74 would coact with the slot portions 81 during tightening of the clamp. Similarly, the reduced screw portions 68 and 71 could be shifted into the slot extensions 82 when the clamp is in loose or released condition.

In Fig. 7, I have shown an alternative construction for the screw incorporating features from both the Fig. 2 and Fig. 5 modifications. Thus, the screw indicated at 83 has a construction at its left-hand end which is generally the same as the left-hand end of the Fig. 2 form with a reduced portion 84 and a tapered portion 86 corresponding to the portions 52 and 49, respectively, in Fig. 2. The right-hand end of the screw 83 has the same construction shown at the right-hand of the screw 61 in Fig. 5 including a reduced portion 87, a tapered portion 88, and a cylindrical bearing portion 89 which correspond to the portions 71, 73 and 74, respectively, in Fig. 5.

In Figs. 8 to 11, a different embodiment of the invention is illustrated wherein the tightening screw has a swivel mounting at one end thereof for effecting engagement and disengagement of the screw thread with the band slots. In this case, the housing or support for the screw has a base portion 91 which is rigidly secured to the band 21 in the same general manner as in Figs. 1–5 and hereinafter described in detail. The sides of the housing extend upwardly and angularly from the base 91, as indicated at 92, and are bent inwardly toward each other, as at 93, to provide a curved enclosure over one end of the screw. The tightening screw is designated generally at 94 and has the usual central body portion 96 with a spiral screw thread 97 for engaging the band slots. The inner end of the screw 94 has a reduced extension 98 with a head 99, the extension 98 being slidably disposed in an apertured swivel plate 101. The swivel plate 101 is pivotally mounted on a pair of side pins or trunnions 102 which are journaled in the housing sides 93 so as to permit pivotal or swinging movement of the screw 94 about the axis of the trunnions 102.

The housing base 91 is turned upwardly at opposite sides of the band 21 to provide an end wall 103 having a transverse slot 104 through which the slotted end portion of the band 21 can extend. The right-hand end of the screw 94 is tapered downwardly, as at 106, to a reduced portion 107 and thence tapers outwardly, as at 108, to a cylindrical bearing portion 109. An enlarged head portion 111 is provided adjacent the cylindrical bearing portion 109 and affords a shoulder 112 therebetween. The right-hand end portion of the screw 94 projects through a key hole slot extending downwardly from the upper edge of the end wall 103 and having a restricted inlet portion 113 and an enlarged portion 114.

The screw 94 is shown in tightened position in Fig. 8 with the screw thread 97 engaging in the band slots 24 and with the screw retained in its left-hand axial position by the tension in the band 21. Thus, at the left-hand end of the screw the central body portion 96 is in abutment with the swivel plate 101 and the reduced extension 98 is projected to the left beyond the swivel plate. At the right-hand end of the screw, the shoulder 112 abuts the outer face of the end wall 103 and the cylindrical bearing portion 109 of the screw is journaled in the enlarged opening 114 of the key hole slot. Obviously, the clamp is thus securely locked against inadvertent release inasmuch as the tension in the tightened band 21 holds the screw 94 against axial movement to the right and the restricted inlet portion 113 of the key hole slot restrains the bearing portion 109 of the screw 94 so as to prevent pivotal movement of the screw about the axis of the trunions 102.

When it is desired to release the clamp, the screw 94 is first loosened a few turns by means of a screwdriver and thereafter the operator can grasp the head portion 111 to shift the screw axially to the right by reason of the sliding relation of the screw portions 98 and 109 in the elements 101 and 103, respectively. This axial shifting movement to the right is limited by engagement of the head 99 with the swivel plate 101 but is sufficient to permit the reduced portion 107 of the screw to be received within the key hole slot in the end wall 103 whereupon the screw can then be pivoted outwardly about the axis of the trunions 102 as shown in Fig. 11. The diameter of the reduced portion 107 is small enough to clear the restriction 113 in the key hole slot, and the screw thread 97 is thereby disengaged from the band slots.

In tightening the clamp, the slotted end portion of the band 21 is projected freely through the screw housing while the screw is in its outwardly pivoted position. Thereafter the screw 94 is swung inwardly while held in proper axial position for inserting the reduced neck portion 107 into the key hole slot. Upon release of the screw, the tension in the band retracts the screw 94 axially into preliminary locked position with the enlarged cylindrical portion 109 disposed within the enlargement 114 of the key hole slot and the screw can thereafter be tightened to effect the desired degree of clamping action. Inasmuch as pivotal release of the screw 94 can be effected only after axial shifting of the screw to the right, it will be seen that increased tightening of the clamp serves to urge the screw 94 axially to the left so that the safety or locking feature of the device is realized to an even greater degree as the tightness of the clamp is increased.

Figs. 12 to 14 illustrate the details of the connection between the screw housing and the clamping band. This feature of the invention is illustrated in connection with a two part housing of the type shown in Figs. 1 to 5, but it will be understood that the method of attachment is also applicable to the screw housing illustrated in Figs. 8 to 11. The end portion of the band 21 is bent upwardly along spaced lines, as at 116, in order to accommodate the underlying base 28 of the saddle portion of the housing. The oppositely disposed saddle sides 29 extend upwardly from the saddle base 28 at the opposite side edges of the band 21. The portion of the band 21 which overlies the saddle base 28 is provided with a pair of transversely spaced slots 119, and a pair of tangs 121 are struck upwardly from the saddle base 28 within the confines of the latter, these tangs 121 projecting through the slots 119 in the band and being bent laterally outwardly and clinched downwardly into secure engagement with the band. To accommodate the band material which is forced downwardly during the clinching step, the saddle base 28 is cut away, as at 120, around the free edges of the tangs in order to provide the required peripheral clearance. The downward clinching of the tangs 121 effects a depression of the material of the band, as indicated at 122, so that in finally assembled relation both the upper and lower surfaces of the saddle and band assembly are substantially smooth and continuous, as best seen in Figs. 13 and 14. It will also be seen that both the tangs 121 and the recesses formed in the band as a result of the depressed portions 122 extend transversely of the band 21. As a result, this method of attachment not only provides a strong joint or connection but also avoids introducing longitudinal creases or bends in the band which tend to interfere with bending of the band to conform to the curvature of the hose. In other words, I have found that tang-receiving recesses which are depressed into the band and extend longitudinally thereof constitute in effect strengthening ribs which tend to resist flexing of the band so that perfect curvature to conform to the hose cannot be realized.

Fig. 15 is an illustration of an end portion 123 of a clamping band 21 wherein the screw-receiving slots have a generally trapezoidal configuration as indicated at 124. This modification of the slot construction is advantageous in some instances, since it conserves band material between adjacent slots, particularly between the end portions thereof, so as to obtain maximum strength in the band, and at the same time the slot configuration provides parallel straight edge or wall portions for engaging the opposite flat and curved faces of the screw thread.

From the foregoing it will be seen that my invention provides a novel concept in a hose clamp of the type described in that the tightening screw or worm has a floating mounting for limited axial shifting movement. This axial shiftability of the screw in cooperation with the structure of the screw housing and the provision of one or more reduced portions on the screw permits simple disengagement of the screw thread from the band slots while the slotted end of the band is still in overlapping position and thereby greatly facilitates rapid attaching and releasing of the clamp.

Although the invention has been described with particular reference to certain specific structural embodiments thereof, it is to be understood that various modifications and alternatives may be resorted to without departing from the scope of the invention as defined in the appended claims.

I claim:

1. A hose clamp comprising a clamping band adapted to surround a hose in clamping relation, said band having at one end thereof a plurality of spaced apart openings, housing means secured to the other end of said band and having an end wall, a tightening screw rotatably mounted in said housing means and adapted to engage in said openings when said one end of the band is projected through said housing means in overlapping relation with the other end, said end wall having a slot therein and said screw extending through said slot and being axially movable to a limited extent relative to said housing means, a tapered portion on said screw engageable with the periphery of said slot for camming the screw toward the band into increased operating engagement with the openings in the band when the screw is advanced in one axial direction, a relatively large diameter bearing portion on said screw at one end of said tapered portion adapted to seat in journaled relation in said slot when said screw is fully engaged in said openings, a radial shoulder portion on said screw adjacent said bearing portion and adapted to abut against said end wall when said screw is in said fully engaged position, and a relatively reduced diameter portion on said screw at the other end of said tapered portion whereby to permit movement of the screw outwardly from the band and disengagement of the screw from the openings in the band when said screw is shifted in the opposite axial direction to register said reduced portion in said slot.

2. A hose clamp comprising a clamping band adapted to surround a hose in clamping relation, said band having a plurality of spaced apart openings at one end thereof, a screw housing having a pair of spaced end walls mounted at the other end of said band, said walls having slots therein, an elongated tightening screw rotatably mounted in said housing and projecting at its ends through said slots, said screw being axially movable within said housing and being adapted to engage in said openings in the band when said one end of the band is projected through said housing in overlapping relation with said other end, radial shoulder portions adjacent the opposite ends of said screw adapted to abut said end walls for limiting the extent of axial movement of the screw in one direction, bearing portions on said screw immediately adjacent said shoulder portions and adapted to journal the screw in said slots, said screw being retained in operative relation with the openings in the band by engagement of the peripheral edges of said slots with said bearing portions when the screw is in one of its axial positions with the shoulder portions abutting said end walls, reduced portions on said screw spaced axially from said bearing portions whereby to permit movement of the screw within said slots outwardly from the band with consequent disengagement of the screw from the openings in the band when said screw is shifted in the opposite axial direction to register said reduced portions in said slots, and tapered portions on said screw intermediate said bearing portions and said reduced portions, said tapered portions being engageable with the peripheral edges of said slots for camming the screw toward the band into increased operative engagement with the openings in the band upon axial movement of the screw in said one direction in response to clamp-tightening rotation thereof.

3. A hose clamp comprising a clamping band adapted to surround a hose in clamping relation, a housing mounted at one end of said band, and a tightening screw rotatably mounted in said housing and having a spiral thread, said thread having a flat working face at one side thereof and a curved face at the other side, and said band having at its opposite end a plurality of spaced generally triangular slots adapted to receive said thread in operating engagement therewith, each of said slots having a straight wall adapted to engage the flat face of said thread and an opposed pair of angularly related walls adapted to be engaged only at spaced points by the curved face of said thread.

4. A hose clamp comprising a clamping band adapted to surround a hose in clamping relation, said band having at one end thereof a plurality of spaced apart openings, housing means secured to the other end of said band and having a pair of spaced end walls, a tightening screw rotatably mounted in said housing means and adapted to engage in said openings when said one end of the band is projected through said housing means in overlapping relation with the other end, said end walls having apertures therein and said screw extending through said apertures and being axially movable to a limited extent relative to said housing means, tapered portions on said screw engageable with the edges of said apertures for camming the screw toward the band into increased operating engagement with the openings in the band when the screw is advanced in one axial direction, said tapered portions also permitting movement of the screw outwardly from the band and disengagement of the screw from the openings in the band when said screw is shifted in the opposite axial direction relative to said apertures, at least one bearing portion of uniform diameter on said screw adjacent one of said tapered portions and adapted to seat in one of said apertures in journaled relation when said screw is fully engaged in said openings, and a radial shoulder portion on said screw adjacent said bearing portion for abutting one of said end walls in said fully engaged position of said screw.

5. The structure of claim 4 further characterized in that the apertures in said end walls comprise slots each having a main portion of enlarged width and an end extension of reduced width, the main slot portion being cooperable with said bearing portion and said tapered portion of the screw and the end extension being adapted to receive the screw when shifted in said opposite axial direction for providing increased disengaging clearance between the screw and the openings in the band.

6. The structure of claim 1 further characterized in that said slot comprises a main portion of enlarged width cooperable with said bearing portion and said tapered portion of the screw and said slot also has an end extension of reduced width adapted to receive said reduced diameter portion of the screw for providing increased disengaging clearance.

7. The structure of claim 4 further characterized in that said radial shoulder portion is provided at one end of the screw by an enlarged head portion on the screw disposed exteriorly of the housing means and said screw also projects from the housing means at its other end and has at said other end an enlarged finger piece, the screw being adapted to be manipulated by means of said head portion and said finger piece.

8. A hose clamp comprising a clamping band adapted to surround a hose in clamping relation, said band having at one end thereof a plurality of spaced apart openings, a screw support mounted at the other end of said band, a tightening screw having a portion of relatively large diameter and a portion of relatively reduced diameter and rotatably mounted in said support and adapted to engage in said openings when said one end of the band is disposed in overlapping relation with the other end, said support having a slot with a main portion of enlarged width and an end extension of reduced width and said screw extending through said slot for limited axial shifting movement of the screw relative to said support, said main portion of said slot being engageable at its periphery with said relatively large diameter portion of said screw for holding the screw in engagement in said openings in one axial position of the screw, and means including said relatively reduced diameter portion on said screw for permitting movement of the screw outwardly from the band into said end extension of the slot for disengaging the screw from the openings in the band in the opposite axial position of the screw, said end extension of said slot providing increased disengaging clearance between the screw and said openings.

9. A hose clamp comprising a clamping band adapted to surround a hose in clamping relation, said band having at one end thereof a plurality of spaced apart openings, housing means secured to the other end of said band and having a pair of spaced end walls, a tightening screw rotatably mounted in said housing means and adapted to engage in said openings when said one end of the band is projected through said housing means in overlapping relation with the other end of the band, said end walls having apertures therein each with a main portion of enlarged width and an end extension of reduced width and said screw extending through said apertures for limited aixal shifting movement relative to said housing means, at least one bearing portion of relatively large diameter on said screw adapted to seat in journaled relation in the main portion of one of said apertures when said screw is engaged in said openings in one axial position of the screw, and reduced diameter portions on said screw adapted to be received within the end extensions of said apertures in the opposite axial position of the screw for permitting movement of the screw outwardly from the band to disengage the screw from the openings in the band, the end extensions of said apertures providing increased disengaging clearance between the screw and said openings.

10. A hose clamp comprising a clamping band adapted to surround a hose in clamping relation, said band having at one end thereof a plurality of spaced apart openings, housing means secured to the other end of said band and having a pair of spaced end walls, a tightening screw rotatably mounted in said housing means and adapted to engage in said openings when said one end of the band is projected through said housing means in overlapping relation with the other end of the band, said end walls having apertures therein each with a main portion of enlarged width and an end extension of reduced width and said screw extending through said apertures for limited axial shifting movement relative to said housing means, at least one bearing portion of relatively large diameter on said screw adapted to seat in journaled relation in the main portion of one of said apertures when said screw is engaged in said openings in one axial position of the screw, and tapered portions on said screw engageable with the periphery of the main portions of said apertures for camming the screw toward the band into increased operating engagement with the openings in the band in said one axial position of the screw, said tapered portions also permitting movement of the screw outwardly from the band into said end extensions of said apertures for disengaging the screw from the openings in the band in the opposite axial position of the screw.

11. A hose clamp comprising a clamping band adapted to surround a hose in clamping relation, said band having at one end thereof a plurality of spaced apart openings, housing means secured to the other end of said band and having a pair of spaced end walls, a tightening screw rotatably mounted in said housing means and adapted to engage in said openings when said one end of the band is projected through said housing means in overlapping relation with the other end, said end walls having apertures therein and said screw extending through said apertures and being axially movable to a limited extent relative to said housing means, taper means on said screw engageable with the periphery of at least one of said apertures for camming the screw toward the band into increased operating engagement with the openings in the band when the screw is advanced in one axial direction, said taper means also permitting movement of the screw outwardly from the band and disengagement of the screw from the openings in the band when said screw is shifted in the opposite axial direction relative to said one aperture, and radial shoulder means extending around substantially the entire circumference of said screw for abutting at least one of said end walls when said screw is fully engaged in said openings whereby to limit the extent of axial movement of the screw in one direction.

12. The structure of claim 11 further characterized in that said screw also has a reduced diameter portion at the innermost end of said taper means adapted to be moved into register with said one aperture when the screw is shifted in said opposite direction.

13. A hose clamp comprising a clamping band adapted to surround a hose in clamping relation, said band having at one end thereof a plurality of spaced apart openings, housing means secured to the other end of said band and having a pair of spaced end walls, a tightening screw rotatably mounted in said housing means, said tightening screw having a main body portion with a thread adapted to engage in said openings when said one end of the band is projected through said housing means in overlapping relation with the other end, said end walls having apertures therein and said screw extending through said apertures and being axially movable to a limited extent relative to said housing means, reduced portions on said screw having a smaller diameter than said body portion for permitting movement of the screw outwardly from the band and disengagement of the screw from the openings in the band when the screw is shifted in one axial direction to register said reduced portions in said apertures, an enlarged head portion at one end of the screw providing a radially extending shoulder of greater diameter than said body portion, said shoulder extending around substantially the entire circumference of the screw and being spaced axially from one of said reduced portions and being adapted to abut the outside of one of said end walls for limiting the extent of axial movement of the screw in the opposite axial direction, and a tapered portion on said screw intermediate said one reduced portion and said shoulder, said tapered portion being engageable with the edge of one of said apertures for camming the screw toward the band into increased operative engagement with the openings in the band upon axial movement of the screw in said opposite direction in response to clamp-tightening rotation thereof.

14. The structure of claim 8 further characterized in that said screw support has a pair of axially spaced end walls with slots therein for receiving the screw, at least one of said slots having said main portion of enlarged width and said end extension of reduced width.

15. A hose clamp comprising a clamping band adapted to surround a hose in clamping relation, said band having at one end thereof a plurality of spaced apart openings, housing means secured to the other end of said band and having a pair of spaced end walls, a tightening screw rotatably mounted in said housing means and adapted to engage in said openings when said one end of the band is projected through said housing means in overlapping relation with the other end, said end walls having slots therein with at least one slot having a main portion of enlarged width and an end extension of reduced width and said screw extending through said slots and being axially movable to a limited extent relative to said housing means, taper means on said screw engageable with the edge of said main portion of said one slot for camming the screw toward the band into increased operating engagement with the openings in the band when the screw is advanced in one axial direction, means including a portion of relatively reduced diameter on said screw at the innermost end of said taper means for permitting movement of the screw outwardly from the band into said end extension of said one slot for disengaging the screw from the openings in the band when the screw is shifted in the opposite axial direction relative to said one slot, said end extension of said one slot providing increased disengaging clearance between the screw and said openings, and radial shoulder means extending around substantially the entire circumference of said screw adjacent the outermost end of said taper means for abutting at least one of said end walls when said screw is fully engaged in said openings whereby to limit the extent of axial movement of the screw in said one direction.

References Cited in the file of this patent

UNITED STATES PATENTS

| | | |
|---|---|---|
| 2,345,832 | Pritchard | Apr. 4, 1944 |
| 2,395,273 | Hill et al. | Feb. 19, 1946 |

FOREIGN PATENTS

| | | |
|---|---|---|
| 586,235 | Great Britain | Mar. 12, 1947 |